United States Patent
Cooper

(10) Patent No.: US 11,644,657 B2
(45) Date of Patent: May 9, 2023

(54) RADIATION DELIVERY APPARATUS FOR MICROSCOPE SYSTEMS

(71) Applicant: Andor Technology Limited, Belfast (GB)

(72) Inventor: David Cooper, Newmarket (CA)

(73) Assignee: Andor Technology Limited, Belfast (GB)

( * ) Notice: Subject to any disclaimer, the term of this patent is extended or adjusted under 35 U.S.C. 154(b) by 366 days.

(21) Appl. No.: 16/911,471

(22) Filed: Jun. 25, 2020

(65) Prior Publication Data
US 2020/0409133 A1    Dec. 31, 2020

(30) Foreign Application Priority Data

Jun. 27, 2019    (GB) ..................................... 1909288

(51) Int. Cl.
| | |
|---|---|
| G02B 21/08 | (2006.01) |
| F21V 8/00 | (2006.01) |
| G02B 26/04 | (2006.01) |
| G02B 21/00 | (2006.01) |
| G02B 27/09 | (2006.01) |
| H01S 3/00 | (2006.01) |
| G02B 27/48 | (2006.01) |

(52) U.S. Cl.
CPC ........... *G02B 21/08* (2013.01); *G02B 6/0006* (2013.01); *G02B 6/0008* (2013.01); *G02B 21/0032* (2013.01); *G02B 26/04* (2013.01); *G02B 27/0933* (2013.01); *G02B 27/48* (2013.01); *H01S 3/005* (2013.01)

(58) Field of Classification Search
CPC .... G02B 21/08; G02B 6/0006; G02B 6/0008; G02B 21/0032; G02B 26/04; G02B 27/0933; G02B 27/48; H01S 3/005

USPC ......................................................... 359/385
See application file for complete search history.

(56) References Cited

U.S. PATENT DOCUMENTS

2011/0134519 A1    6/2011    Cooper

FOREIGN PATENT DOCUMENTS

| CN | 206725864 U | | 12/2017 |
|---|---|---|---|
| JP | 2015114619 A | * | 6/2015 |
| JP | 6332728 B | | 5/2018 |
| WO | 2009094165 A1 | | 7/2009 |

OTHER PUBLICATIONS

UK Search Report dated Dec. 17, 2019, for corresponding Application No. GB 1909288.1, filed on Jun. 27, 2019; consisting of 6-pages.

* cited by examiner

*Primary Examiner* — William Choi
(74) *Attorney, Agent, or Firm* — Christopher & Weisberg, P.A.

(57) ABSTRACT

A laser beam delivery apparatus for a microscope comprises first and second optical diffusers that are configured to move in a periodic manner with a respective different frequency. Each optical diffuser may comprise a spinning disk. The laser light is spatially randomized by the first spinning diffuser and its spatial pattern is further randomized by the second diffuser. The second diffuser prevents any spatial pattern from repeating after one revolution of the first diffuser, which prevents beating patterns from forming when the light is imaged through a spinning confocal disk and increases the uniformity in other cases.

21 Claims, 3 Drawing Sheets

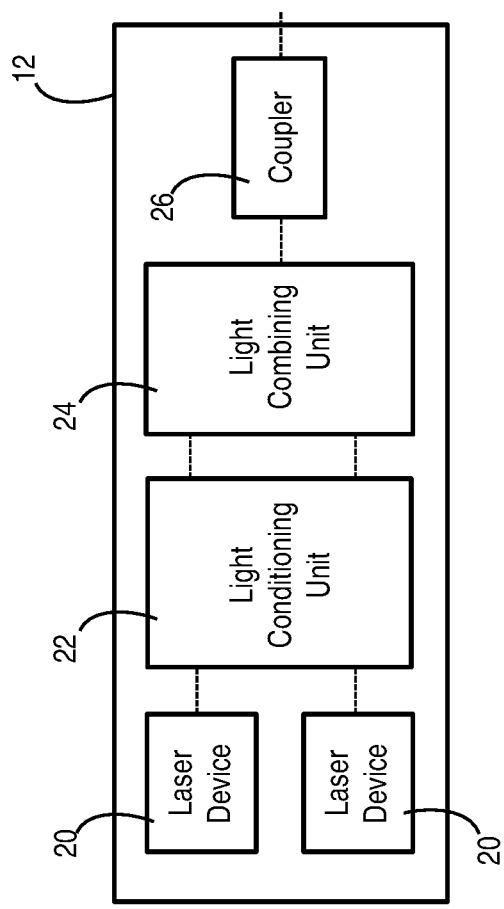
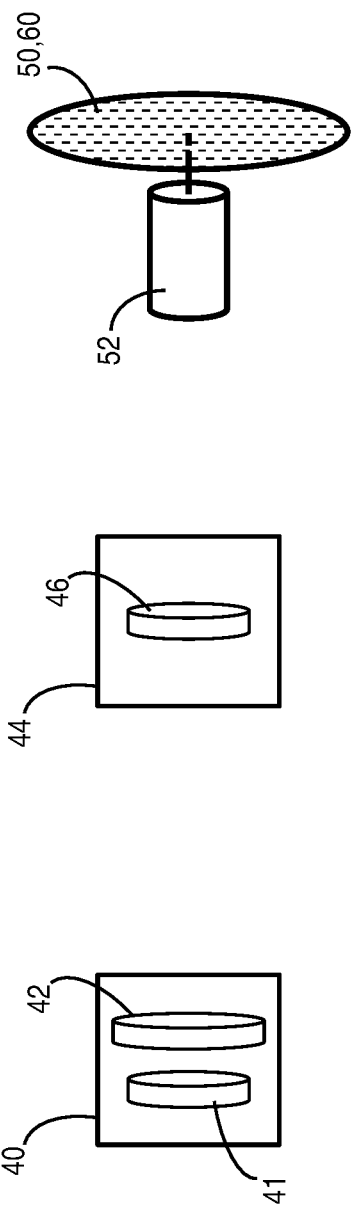

RADIATION DELIVERY APPARATUS FOR MICROSCOPE SYSTEMS

CROSS-REFERENCE TO RELATED APPLICATION

This application is related to and claims priority to Great Britain Patent Number 1909288.1, filed Jun. 27, 2019, the entirety of which is incorporated herein by reference.

FIELD

This invention relates to radiation delivery apparatus especially, but not exclusively, for use with microscope systems. The invention relates particularly to radiation delivery apparatus comprising a multimode optical fibre.

BACKGROUND

Using laser light as an illumination source in fluorescent microscopy provides much higher brightness than other illumination sources. Traditionally, single mode optical fibre is used to deliver laser light to the microscope, but the resulting Gaussian like mode shape either provides significantly less light at the edges of the image, or necessitates rejecting a significant part of the light by using only the more uniform central part of the Gaussian distribution.

It is known to use a multimode optical fibre for light delivery in a microscope system to provide uniform light intensity across an image. A problem with using multimode fibres is that the modes of supported by the fibre can provide coherent interference due to the high coherence of the light source. This provides a speckle pattern in the image that produces small spatial variation in the image even if the overall envelope of the illumination is flat.

A known solution to this problem is to provide an eccentric motor for vibrating the optical fibre, which homogenizes the light from the fibre and helps to provides uniform images. This design requires that the fibre be looped multiple times around the eccentric motor to provide sufficient vibration, taking up space and adding vibration to the microscope system. As a result, this solution has two main disadvantages in that it is relatively large and produces significant vibration. This is particularly a problem in integrated imaging systems where a compact size is needed, and the vibration is difficult to isolate from the imaging system where nanometre precision is typically required. An alternative is to use multimode lasers, which introduce a degree of randomness into the light so that an eccentric vibration motor is not needed. However, restricting the design of the microscope to multimode laser diodes is considered to be too limiting in terms of wavelength, performance, and cost.

It would be desirable to mitigate the problems outlined above.

SUMMARY

A first aspect of the invention provides a radiation delivery apparatus comprising:
 a radiation beam input;
 a radiation beam output; and
 beam delivery means configured to deliver a radiation beam from said radiation beam input to said radiation beam output along an optical path, wherein said beam delivery means comprises:
 first optical homogenizing means; and
 second optical homogenizing means,
and wherein said first optical homogenizing means and said second optical homogenizing means are configured to move in a periodic manner with a respective different frequency.

Preferably, said first optical homogenizing means comprises a first optical diffuser that intersects and is movable with respect to said optical path. Said first optical diffuser may be optically transmissive. Alternatively said first optical diffuser is optically reflective.

Preferably, said second optical homogenizing means comprises a second optical diffuser that intersects and is movable with respect to said optical path. Said second optical diffuser may be optically transmissive. Alternatively, said second optical diffuser is optically reflective.

In preferred embodiments, either one or both of said first optical homogenizing means and said second optical homogenizing means are rotatable with respect to the optical path. Preferably, when each is rotatable, said first optical homogenizing means and said second optical homogenizing means are rotatable at a respective different speed.

In preferred embodiments, said first and second optical diffusers are rotatable, and are rotated in use at a respective different speed to each other.

Typically, said first and second optical diffusers are arranged in said optical path so that said radiation beam travels, in use, from said first optical diffuser to said second optical diffuser.

Typically, said radiation beam output comprises an output optical fibre, preferably a multimode optical fibre, and wherein said beam delivery means is configured to direct said radiation beam into an ingress end of said output optical fibre. The beam delivery means may be configured to direct said radiation beam from said second optical diffuser to said output optical fibre, preferably through free space. The output fibre may have an optical coupler at an ingress end of the output fibre, the optical coupler preferably being configured to receive the radiation beam from free space and to direct the radiation beam into the ingress end of the output fibre. Said optical coupler may comprise at least one optical element for de-magnifying the radiation beam. The optical coupler may comprise at least one optical element optical element for focusing the radiation beam into the ingress end of the output fibre.

In preferred embodiments, said radiation beam input comprises in input optical fibre, preferably a multimode optical fibre, and wherein said beam delivery means is configured to direct said radiation beam from an egress end of said input optical fibre to said first optical homogenizing means. Said beam delivery means may be configured to direct said radiation beam from said input optical fibre to said first optical diffuser, preferably through free space.

An optical coupler may be provided at an egress end of the input fibre, the optical coupler preferably being configured to receive the radiation beam from the egress end of the input fibre and to emit the radiation beam into free space. The optical coupler may comprise at least one optical element for magnifying the radiation beam. The optical coupler may comprise at least one optical element for focusing or imaging the radiation beam onto the first optical homogenizing means.

In some embodiments, said second optical homogenizing means comprises means for moving the output fibre in a periodic manner, preferably in a reciprocating manner.

In preferred embodiments, the respective periodic movement of the first and second optical homogenizing means is configured so that a cross-sectional spatial pattern of the radiation beam at said radiation beam output after any one period of the higher frequency one of the first and second homogenizing means is substantially uncorrelated with the cross-sectional spatial pattern of the radiation beam at said radiation beam output after the previous period of the higher frequency one of the first and second homogenizing means.

Preferably, said first optical homogenizing means is movable to modify a cross-sectional spatial pattern of said radiation beam, and wherein said second optical homogenizing means is movable to further modify said cross-sectional spatial pattern of said radiation beam.

From another aspect the invention provides a microscope system comprising radiation source module, a microscope module and a radiation delivery apparatus of the first aspect, wherein said radiation delivery apparatus is configured to delivery the radiation beam from the radiation source module to the microscope module.

Another aspect of the invention provides a method of homogenizing a radiation beam, the method comprising:
 directing said radiation beam to first optical homogenizing means;
 directing said radiation beam from said first optical homogenizing means to second optical homogenizing means; and
 moving said first optical homogenizing means and said second optical homogenizing means in a periodic manner with a respective different frequency.

The preferred method includes modifying a cross-sectional spatial pattern of said radiation beam by moving said first optical homogenizing means; and further modifying said cross-sectional spatial pattern of said radiation beam by moving said second optical homogenizing means.

Another aspect of the invention provides an apparatus for homogenizing a radiation beam, the apparatus comprising: means for directing said radiation beam to first optical homogenizing means; means for directing said radiation beam from said first optical homogenizing means to second optical homogenizing means; means for moving said first optical homogenizing means in a periodic manner; means for moving and said second optical homogenizing means in a periodic manner, wherein said moving means are configured to move said first optical homogenizing means and said second optical homogenizing means with a respective different frequency.

In preferred embodiments, laser light from a multimode fibre is spatially randomized by a first spinning diffuser, or homogenizer, and coupled into a second multimode fibre. A second diffusing means, or homogenizer, may be used to further randomize the spatial pattern, in particular the cross-sectional spatial pattern of the laser/radiation beam. The second diffusing means prevents any spatial pattern from repeating after one revolution, or period, of the first diffuser, which prevents beating patterns from forming when the light is imaged through a spinning confocal disk and increases the uniformity in other cases. In the preferred embodiment, the second diffusing means is a second rotating diffuser running at a different speed than the first. In another embodiment, the second diffusing means is a device which physically moves the second fibre.

Preferred embodiments place no limit on the coherence of the laser source and provide excellent uniformity at reduced vibration and space.

Further advantageous aspects of the invention will be apparent to those ordinarily skilled in the art upon review of the following description of a specific embodiment and with reference to the accompanying drawings.

BRIEF DESCRIPTION OF THE DRAWINGS

Embodiments of the invention are now described by way of example and with reference to the accompanying drawings in which like numerals are used to denote like parts and in which:

FIG. 2 is a block diagram of an exemplary radiation source module, being part of the microscope system of FIG. 1;

FIG. 3 is a schematic diagram of a first exemplary optical coupler;

FIG. 4 is a schematic diagram of a second exemplary optical coupler;

FIG. 5 is a schematic diagram of a rotating diffuser; and

DETAILED DESCRIPTION

Figure 1:
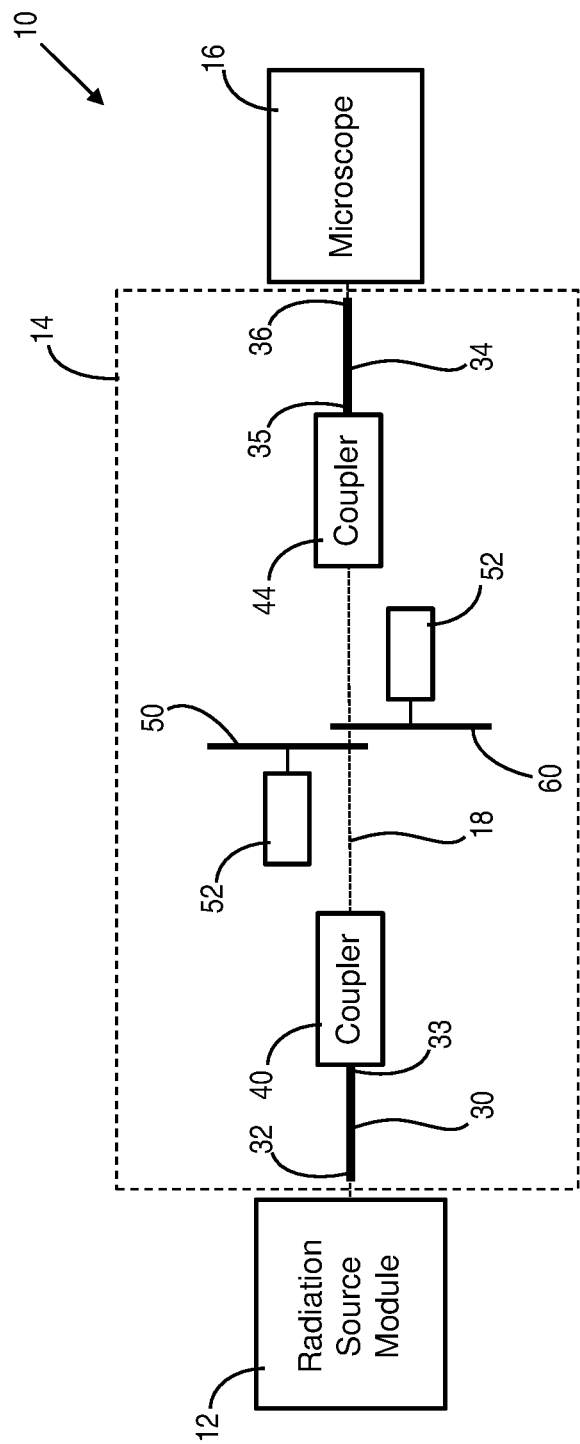
FIG. 1 is a block diagram of a microscope system embodying one aspect of the invention and including a radiation delivery apparatus embodying another aspect of the invention.

Referring now to FIG. 1 of the drawings there is shown, generally indicated as 10, an optical microscope system embodying one aspect of the invention. The microscope system 10 comprises a radiation source module 12, a radiation delivery apparatus 14 and a microscope module 16. The microscope system 10 is configured so that a radiation beam 18 emitted by the radiation source module 12 is delivered to the microscope 16 by the radiation delivery apparatus 14. The radiation delivery apparatus 14 is configured to deliver the radiation beam 18 from a beam input to a beam output along an optical path. In particular, the radiation delivery apparatus 14 comprises beam delivery means for delivering the beam 18 between the input and output, the beam delivery means comprising first and second optical homogenizing means, as is described in more detail hereinafter.

FIG. 2 shows an example of a typical radiation source module 12. The radiation source module 12 comprises one or more radiation source 20 for generating and emitting radiation. In typical embodiments the radiation is light, in particular light in the ultraviolet (UV), visible or NIR (near infrared) frequency bands. In preferred embodiments, therefore, the radiation source module 12 may be described as a light source module comprising one or more light source 20. In preferred embodiments, the light is laser light and each light source 20 comprises a laser device. However, each radiation source may comprise any source able to generate and emit radiation, including but not limited to, light emitting diodes (LEDs), laser diodes, solid state devices, super luminescent diodes (SLDs) or arc lamps. Each radiation source 20 is configured to generate and emit radiation, or light, at one or more wavelengths. In the example of FIG. 2, two laser devices 20 are shown, but it will be understood that in alternative embodiments there may be a single radiation source or more than two radiation sources. Each laser device 20 may be a single mode laser device or a multimode laser device. In preferred embodiments, the radiation source module 12 emits light, preferably laser light, at multiple wavelengths, i.e. the radiation source module 12 may comprise a multiwavelength radiation, or laser, source. As illustrated, this may be achieved by providing the module 12 with multiple radiation sources 20, each producing radiation at different wavelengths or in different frequency bands. Alternatively, the radiation source module 12 may emit radiation at a single wavelength. In preferred embodiments in which the radiation source module 12 comprises one or more laser devices 20, the resultant beam 18 comprises coherent laser light.

Optionally, the radiation source module 12 comprises a radiation control and conditioning unit 22 for manipulating the cross-sectional shape and/or dimensions of the beam 18 emitted from the module 12. In embodiments where there are more than one radiation source 20, the control and conditioning unit 22 may include a respective control and conditioning subunit (not shown) for each radiation source 20. The control and conditioning unit 22 (or each of its subunits as applicable) may comprise any optical element or combination of optical elements (not shown) for controlling and conditioning the beam 18 in any desired conventional manner. For example, the control and conditioning unit 22 (or each of its subunits as applicable) may comprise a Galilean telescopic beam expander, or anamorphic prismatic or cylindrical optics, and/or any other conventional beam shaping means, and/or an acousto-optic tunable filter (AOTF), or a mechanical shutter.

In embodiments where the radiation source module 12 has more than one radiation source 20, it may include a light combining unit 24 comprising one or more optical elements arranged in any conventional manner to combine the respective beams from each radiation source 20 to produce the output radiation beam 18. The light combining unit 24 may for example comprise one or more mirror and/or beam splitter and/or dichroic beam combiner. In the illustrated embodiment, the light combining unit 24 is located after the light conditioning unit 22 such that the light from the laser sources 20 is conditioned before it is combined. In alternative embodiments (not illustrated) the light combining unit 24 is located before the light conditioning unit 22 such that the light from the laser sources 20 is combined before it is conditioned.

The radiation source module 12 typically includes an optical coupler 26 through which the radiation beam 18 is emitted from the module 12. The optical coupler 26 comprises one or more optical elements (not shown) for directing the beam 18 to an optical fibre. Typically, the optical coupler 26 comprises one or more lens (for example a collimator lens, a condenser lens and/or a micro-objective) for focusing the beam 18 onto the end of the optical fibre. The configuration may be such that the optical coupler 26 emits the beam 18 into free space.

Referring again to FIG. 1, in typical embodiments the radiation delivery apparatus 14 comprises an input optical fibre 30 having an ingress end 32 for receiving the radiation beam 18 from the radiation source module 12. The ingress end 32 may receive the radiation beam 18 from free space. In preferred embodiments, the optical coupler 26 is configured to focus the radiation beam 18 onto the ingress end 32 of the fibre 30. The respective cross-sectional shape and size of the beam 18 and of the optical core of the fibre 30 are mutually compatible to allow the beam 18 to be transmitted along the fibre 30. This compatibility may be achieved, at least in part, by the control and conditioning unit 22. In alternative embodiments (not illustrated), the input optical fibre 30 may be omitted, as is described in more detail hereinafter.

The radiation delivery apparatus 14 also comprises output means preferably comprising an output optical fibre 34 having an egress end 36 from which the radiation beam 18 is delivered to the microscope module 16. The egress end 36 may emit the radiation beam into free space.

The optical fibres 30, 34 may be conventional, typically comprising an optically transparent core (not shown) for transmitting the beam 18, the core usually being surrounded by a transparent cladding material (not shown) with a lower index of refraction than the core. The core and cladding may be formed from any suitable material, e.g. glass (silica) or plastics. The fibres 30, 34 may be described as optical waveguides and may take any known form, for example the type known as light pipes, which comprise an optically transparent core (e.g. formed from glass or plastics) but may have no cladding.

In preferred embodiments, the output optical fibre 34 is a multimode optical fibre. It is preferred that the input optical fibre 30 is a multimode optical fibre, but it may alternatively be a single mode optical fibre. A multimode optical fibre is an optical fibre that supports multiple light propagation paths or modes. The multiple light paths or light modes may be supported concurrently over a broad spectrum of wavelengths. In contrast, a single mode optical fibre supports only a single mode. Multimode fibres generally have a wider core diameter (typically 50-400 micrometers) than single mode fibres. The core diameter of a multimode optical fibre is larger than the wavelength of the light carried in it. The core of the multimode fibres 30, 34 may have a circular cross section, a square cross section, a rectangular cross section, or any other suitable cross section.

By way of example, the input fibre 30 may have a core diameter of 50 □m and a numerical aperture (NA) of 0.12. The output fibre 34 may have a core diameter of 200 □m and a numerical aperture (NA) of 0.12. In typical embodiments the core diameter of the input fibre 30 is smaller that the core diameter of the output fibre.

Optionally, the ingress end 32 of the optical fibre 30 and the egress end 36 of the optical fibre 34 may be provided with or be connectable to an input connector (not shown) and an output connector (not shown), respectively. The input and output connectors may be of any suitable conventional type.

The microscope module 16 may comprise any conventional type of microscope (not shown) that requires a radiation beam for irradiating or exciting a sample. For example, the microscope may be a widefield microscope, a confocal microscope, e.g. a spinning disk confocal microscope, or other optical microscope. The microscope module 16 may be conventional, and may include any other components required for operation of the microscope as would be apparent to a skilled person. The microscope module 16 typically includes an optical coupler (not shown) for receiving the radiation beam 18 from the egress end 36 of the optical fibre 34. The optical coupler may comprise any conventional arrangement of one or more optical components as suits the application. For example, the optical coupler may comprise any one or more of a single lens, multiple lenses, a mirror, multiple mirrors or any combination of suitable optical elements. In alternative embodiments (not illustrated) the radiation delivery apparatus 14 may be coupled to any other end system that requires the radiation beam 18, e.g. a projection display device.

The input fibre 30 has an egress end 33 from which the radiation beam 18 is emitted. The beam 18 may be emitted from the end 33 into free space. In preferred embodiments, an optical coupler 40 is provided at the egress end 33 of the input fibre 30. The optical coupler 40 is configured to receive the beam 18 from the egress end 33 of the input fibre 30 and to emit the beam 18 into free space.

The optical coupler 40 may comprise any conventional type of optical fibre-to-free space coupler. The optical coupler 40 typically comprises one or more optical elements (not shown) arranged to receive the beam 18 from the fibre 30 and directing it to a target in free space. Optionally, the optical coupler 40 includes a collimator. Typically, the optical coupler 40 comprises one or more optical element for magnifying the beam 18. Preferably, the optical coupler 40 comprises one or more optical element for focusing or imaging the beam 18 onto the target. The optical coupler 40 typically includes one or more lens for performing the some or all of the tasks identified above as applicable. FIG. 3 illustrates an exemplary embodiment of the optical coupler 40 comprising a collimating lens 41 and a lens 42 for magnifying and focusing the beam 18 to the free space target.

The output fibre 34 has an ingress end 35 for receiving the radiation beam 18. The beam 18 may be received by the end 35 from free space. In preferred embodiments, an optical coupler 44 is provided at the ingress end 35 of the output fibre 34. The optical coupler 44 is configured to receive the beam 18 from free space and to direct the beam 18 into the ingress end 35 of the output fibre 34. The optical coupler 44 may comprise any conventional type of free space-to-optical fibre coupler. The optical coupler 44 comprises one or more optical elements (not shown) arranged to receive the beam 18 from free space and direct it into the ingress end 35 of the output fibre 34. Typically, the optical coupler 44 comprises one or more optical element for de-magnifying the beam 18. Preferably, the optical coupler 44 comprises one or more optical element for focusing the beam 18 into the ingress end 35 of the output fibre 34. The optical coupler 44 typically includes one or more lens for performing the required tasks. FIG. 4 illustrates an exemplary embodiment of the optical coupler 44 comprising a lens 46 for de-magnifying and focusing the beam 18 into the ingress end 35 of the output fibre 34.

In alternative embodiments, one or other or both of the couplers 40, 44 may be omitted. If either coupler 40, 44 is removed, the relevant end 33, 35 of the corresponding fibre 30, 34 may be located immediately adjacent (e.g. with a spacing of 2 mm or less) the respective diffuser 50, 60, and the diffuser angle is matched to the respective fibre 30, 34.

The radiation delivery apparatus 14 comprises first optical homogenizing means in the preferred form of a first optical diffuser 50 located between the input fibre 30 and the output fibre 34. In preferred embodiments, the first optical diffuser 50 is located between the optical couplers 40, 44. The arrangement is such that the beam 18 is transmitted from the input fibre 30 to the output fibre 34 through the first optical diffuser 50. In preferred embodiments, the optical coupler 40 is configured to direct the beam 18 to the optical diffuser 50, and preferably to focus the beam 18 onto the first optical diffuser 50. In preferred embodiments, the optical coupler 40 is configured to image the beam 18 onto the optical diffuser 50. Advantageously, the optical coupler 40 magnifies the beam 18.

In alternative embodiments (not illustrated), the input optical fibre 30 (and coupler 40) may be omitted, in which case the beam 18 may be imaged or otherwise directed to the optical diffuser 50 directly from the radiation source module 12. The optical coupler 26 typically comprises one or more optical elements (not shown) arranged to direct the beam 18 from the module 12 to a target in free space. Optionally, the optical coupler 26 includes a collimator. Typically, the optical coupler 26 comprises one or more optical element for magnifying the beam 18. Preferably, the optical coupler 26 comprises one or more optical element for focusing or imaging the beam 18 onto the target. The optical coupler 26 typically includes one or more lens for performing the some or all of the tasks identified above as applicable. In such embodiments, the optical coupler 26 may be as illustrated in FIG. 3. The apparatus 14 may include any suitable input means for receiving the beam 18 from the radiation source module 12. For example the input means may simply comprise an aperture (not shown), and/or may optionally comprise one or more optical elements, e.g. lens(es).

In preferred embodiments, the optical coupler 44 is configured to receive the beam 18 and to direct the beam 18 into the ingress end 35 of the output fibre 34. Typically, the optical coupler 44 de-magnifies the beam 18 to suit the numeral aperture (NA) of the output fibre 34.

Conveniently, the optical couplers 40, 44 are aligned with one another on a common axis so that the beam 18 may travel from the coupler 40 to the coupler 44 along an optical path that is coincident or parallel with the common axis. Alternatively, or in addition, the optical coupler 40 may include one or more beam guiding device (not shown) for guiding the beam 18 along an optical path to the first diffuser 50; and/or the optical coupler 44 may include one or more beam guiding device (not shown) for aligning the optics of the coupler 44 with the received beam 18, in which case the couplers 40, 44 need not necessarily be aligned with each other. More generally, the delivery apparatus 14 may include one or more beam guiding device (e.g. any suitable arrangement of mirror(s), beam splitter(s) and/or lens(es)) for guiding the beam 18 along an optical path from the input (e.g. from the input fibre 30 in preferred embodiments) of the apparatus 14 to the output (e.g. to the output fibre 34 in preferred embodiments) of the apparatus 14. As such, the optical path between the input and output of the apparatus 14 need not necessarily be linear. The beam guiding device(s), if present, form part of the beam delivery means of the apparatus 14, the beam delivery means also including the optical homogenizing means.

The optical diffuser 50 may take any conventional form. In preferred embodiments, the diffuser 50 is optically transmissive but it may alternatively be optically reflective. For example the diffuser 50 may be formed from a translucent but preferably non-transparent material, or an optically reflective material, and/or may comprise any one or more of: surface formations, internal formations, surface markings, surface coating, or lenses in order to provide an optically diffusing effect. For example, the diffuser 50 may be formed from ground glass, Teflon, holographic material, opal glass. In preferred embodiments, the diffuser 50 comprises an engineered diffuser in which a pseudo-random pattern is etched into an optically transmissive substrate that is typically made from glass or plastic. In alternative embodiments, the diffuser 50 may comprise a reflecting diffuser. By way of example, the diffuser 50 may be configured to create diffusion with a half angle of between 1°-3°.

In preferred embodiments, the first optical diffuser 50 comprises a rotatable optical diffuser. FIG. 5 shows an example of a rotatable optical diffuser 50, conveniently but not necessarily comprising a disk, coupled to rotational drive means conveniently comprising a motor 52. The motor 52 is operable to rotate the diffuser 50 about its centre. The illustrated diffuser 50 may be referred to as a spinning disk diffuser. The rotational movement of the diffuser 50 is preferably about an axis that is parallel or substantially parallel with the path of the beam 18, or parallel or substantially parallel with the common axis between the couplers 40, 44 in the present example. In preferred embodiments the rotational axis is not exactly parallel with the beam path or common axis (e.g. it may be displaced by 0.5° to 5° from parallel) to avoid reflections back into the fibre end 33. In alternative embodiments, the diffuser 50 may be a reciprocating diffuser 50, and to this end may be coupled to any suitable reciprocating actuator (not shown) for imparting reciprocating motion to the diffuser 50. For example, the reciprocating actuator may comprise a vibration device, e.g. a piezoelectric driver. The reciprocating movement of the diffuser 50 is preferably perpendicular to, or oblique with respect to, the path of the beam 18, or the common axis between the couplers 40, 44. In any event the preferred arrangement is such that the diffuser 50 intersects the path of the beam 18 and is movable with respect to the path of the beam in order to have a diffusing affect on the beam 18 in use.

In preferred embodiments, the diffuser 50 is optically transmissive such that the beam 18 is transmitted through it when travelling from the coupler 40 to the coupler 44. Conveniently, the diffuser 50 intersects the common axis between the couplers 40, 44. The diffuser 50 may be disposed in a plane that is perpendicular with or oblique to the path of the beam 18. It is preferred that the diffuser is disposed in a plane that is substantially but not exactly perpendicular to the path of the beam 18 (e.g. it may be displaced by 0.5° to 5° from perpendicular).

In preferred embodiments, the optical coupler 40 focuses, or images, the beam 18 onto the diffuser 50, preferably with magnification so that the beam 18 produces a spot on the diffuser 50 that is larger than the cross-sectional area of the beam 18 emanating from the coupler 40. For example the magnification factor may be between x2 and x20. In preferred embodiments, the magnification factor implemented by the coupler 40 is larger than the de-magnification factor implemented by the coupler 44. For example, the coupler 40 may magnify the beam 18 by a factor of 8, while the coupler 44 de-magnifies the beam 18 by a factor of 2.5.

The diffuser 50 diffuses, or scatters, the beam 18. This has the effect of spatially randomising, or modifying, the light, particularly in transverse cross-section, i.e. perpendicular to the direction of propagation. The light may be spatially randomised/modified with respect to its intensity or amplitude and/or its phase. The spatial randomisation suppresses speckle that may occur as a result of the coherence of the light produced by the radiation source module 12 (which tends to happen for highly coherent sources (single mode spatially and temporally), and moderately coherent sources (single-mode spatially and multi-mode temporally).

The radiation delivery apparatus includes second optical homogenizing means in the preferred form of a second optical diffuser 60. The second optical diffuser 60 is located between the input fibre 30 and the output fibre 34. In preferred embodiments, the second optical diffuser 60 is located between the optical couplers 40, 44. The arrangement is such that the beam 18 is transmitted from the input fibre 30 to the output fibre 34 through the first and second optical diffusers 50, 60. In the illustrated embodiment, the second diffuser 60 is located between the first diffuser 50 and the output fibre 34, but it may alternatively be located between the first diffuser 50 and the input fibre 34.

The second optical diffuser 60 may take any conventional form. In preferred embodiments, the diffuser 60 is optically transmissive but it may alternatively be optically reflective. For example the diffuser 60 may be formed from a translucent but preferably non-transparent material, or an optically reflective material, and/or may comprise any one or more of: surface formations, internal formations, surface markings, surface coating, or lenses in order to provide an optically diffusing effect. For example, the diffuser 60 may be formed from ground glass, Teflon, holographic material, or opal glass. In preferred embodiments, the diffuser 50 comprises an engineered diffuser in which a pseudo-random pattern is etched into an optically transmissive substrate that is typically made from glass or plastic. In alternative embodiments, the diffuser 60 may comprise a reflecting diffuser. By way of example, the diffuser 60 may be configured to create diffusion with a half angle of between 1°-3°.

In preferred embodiments, the second optical diffuser 60 comprises a rotatable optical diffuser, for example of the type shown in FIG. 5. The second diffuser 60 may therefore be a spinning disk diffuser. The rotational movement of the diffuser 60 is preferably about an axis that is parallel or substantially parallel with the path of the beam 18, or parallel or substantially parallel with the common axis between the couplers 40, 44 in the present example. In preferred embodiments the rotational axis is not exactly parallel with the beam path or common axis (e.g. it may be displaced by 0.5° to 5° from parallel). In alternative embodiments, the diffuser 60 may be a reciprocating diffuser 60, and to this end may be coupled to any suitable reciprocating actuator (not shown) for imparting reciprocating motion to the diffuser 60. For example, the reciprocating actuator may comprise a vibration device, e.g. a piezoelectric driver. The reciprocating movement of the diffuser 60 is preferably perpendicular to, or oblique with respect to, the path of the beam 18, or the common axis between the couplers 40, 44. In any event the preferred arrangement is such that the diffuser 60 intersects the path of the beam 18 and is movable with respect to the path of the beam in order to have a diffusing effect on the beam 18 in use.

In preferred embodiments, the diffuser 60 is optically transmissive such that the beam 18 is transmitted through it when travelling from the coupler 40 to the coupler 44. Conveniently, the diffuser 60 intersects the common axis between the couplers 40, 44. The diffuser 60 may be disposed in a plane that is perpendicular with or oblique to the path of the beam 18. It is preferred that the diffuser is disposed in a plane that is substantially but not exactly perpendicular to the path of the beam 18 (e.g. it may be displaced by 0.5° to 5° from perpendicular).

The first and second diffusers 50, 60 may be spaced apart in the direction of travel of the beam 18 by any suitable distance, for example between 1 mm and 10 mm. Optionally, one or more lens, for example one or more relay lens (not shown) may be provided between the diffusers 50, 60.

Figure 6:
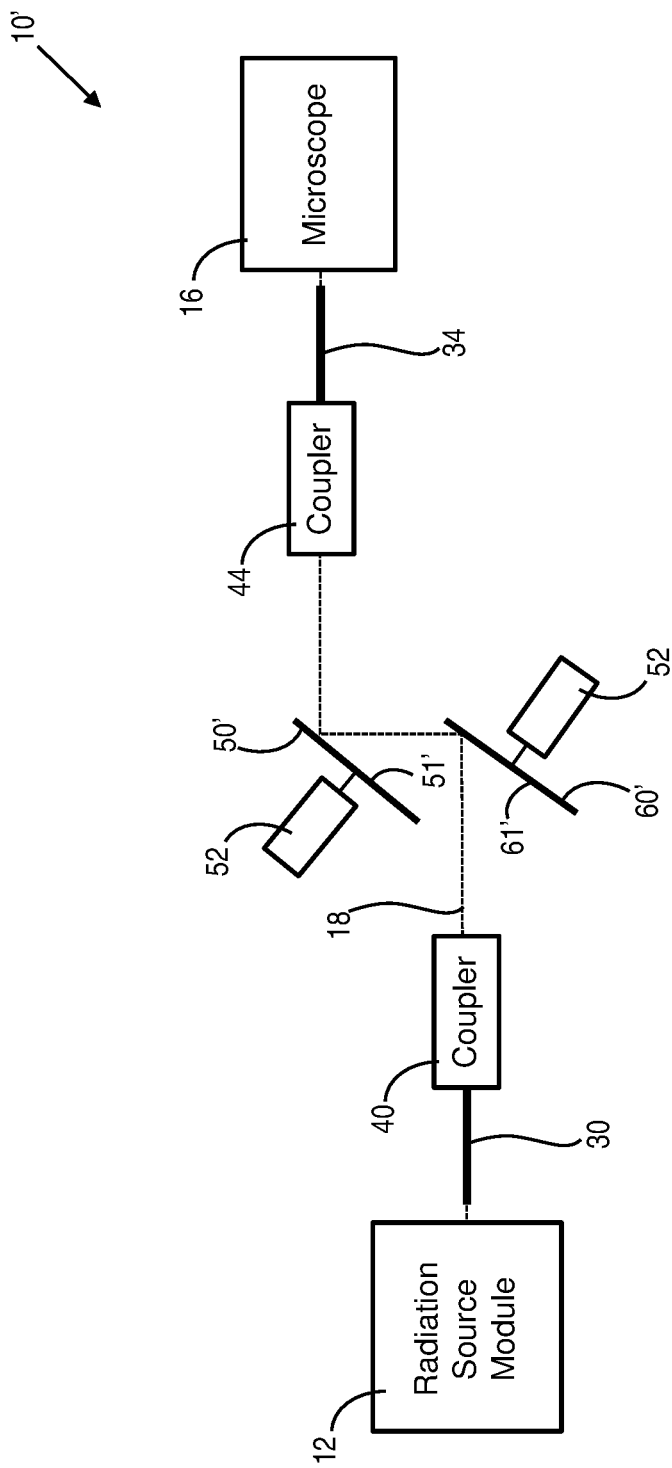
FIG. 6 is a block diagram of an alternative microscope system embodying one aspect of the invention including an alternative radiation delivery apparatus embodying another aspect of the invention.

FIG. 6 shows an alternative embodiment of the optical microscope system 10'. Unless otherwise indicated, the system 10' may be the same as the system 10 of FIG. 1 and the same or similar description may apply as would be apparent to a skilled person. In the system 10', the first and second optical diffusers 50', 60' each comprises a reflective diffuser. For example, each diffuser 50', 60' may have an optically reflective obverse surface 51', 61' that includes formations, markings and/or other optical diffusing means for diffusing the beam 18. The system 10' is arranged such that the beam 18 emanating from coupler 40 is reflected of each diffuser 50', 60' and directed to the coupler 44. In other embodiments (not illustrated) either one of the first and second diffusers may be optically transmissive and the other diffuser may be optically reflective, the system being arranged so that the beam is reflected from one diffuser and passes through the other and is directed to the output fibre.

The second diffuser 60, 60' may be rotated in the same direction as, or in the opposite direction to, the first diffuser 50, 50'. Advantageously, the first and second diffusers 50, 50', 60, 60' are rotated at different speeds. Preferably, the second diffuser 60, 60' is rotated more slowly than the first diffuser 50, 50'. For example the speed of the second diffuser 60, 60' may be between 5% and 95% of the speed first diffuser 50, 50'. By way of example, the first diffuser 50, 50' may be rotated at approximately 5000 rpm, while the second diffuser 60, 60' may be rotated at approximately 4800 rpm.

More generally, the first and second diffusers 50, 50', 60, 60' are advantageously moved at different speeds to one another, whether the movement is rotational or reciprocating. In preferred embodiments, particularly but not exclusively where each diffuser 50, 50', 60, 60' is rotatable, either one of the diffusers 50, 50', 60, 60' is rotated, or otherwise moved, at between 5% and 95% of the speed of the other diffuser 60, 60', 50, 50'. For rotating diffusers, the speed may be the rotational speed or the frequency of rotation. For reciprocating diffusers or other reciprocating components, the speed may be the linear speed or the frequency of reciprocation.

The second diffuser 60, 60' also diffuses, or scatters, the beam 18 and further randomizes, or modifies, its spatial pattern, in particular its spatial pattern in transverse cross-section. Typically, the spatial pattern of the beam 18 is further randomised, or modified, with respect to its intensity (or amplitude) and/or its phase. The arrangement is such that any non-uniformity of the spatial pattern changes over time so that, over time (e.g. during a camera exposure), the non-uniformity averages out such that the spatial pattern is substantially uniform, or at least appears to be uniform. If only one periodic homogenizing means is used, then an instantaneous cross-sectional snapshot of the beam after one period of the homogenizer will look substantially the same as for the previous period, i.e. there will be a correlation between the respective spatial patterns at the end of each period, which can appear as a periodic pattern in images produced by the microscope. Using the second homogenizing means ensures that any such correlation is small, i.e. a periodic pattern does not occur until both homogenizers return to the same initial state, which takes a significantly longer time than one period of the first homogenizer. Successive spatial patterns caused by two homogenizers can be predictable, but appear in practice to be random.

Advantageously therefore, the second diffuser 60, 60' prevents the beam 18 from developing a perceptible periodic spatial pattern, in particular as a result of the periodic movement of the first diffuser 50, 50'. As a result, the beam 18 delivered by the radiation delivery apparatus 14 has a more uniform or homogenized intensity and is able to provide a more uniform irradiation of a sample. In the case where the microscope is a confocal microscope, the action of the second diffuser 60, 60' prevents beating patterns from forming when the light is imaged through a spinning confocal disk.

In alternative embodiments, the second diffuser 60 may be located between the fibre 34 and the microscope 16, or be incorporated into the microscope to receive the beam 18 from the end 36 of the fibre 34. In other alternative embodiments (not illustrated), the second optical diffusing means may comprise means for moving the output fibre 34, preferably in a reciprocating manner or other periodic manner, with respect to the path of the beam 18. For example, this may be achieved by coupling a vibration device to the output fibre 34 in order to vibrate the fibre 34. Any suitable conventional vibration motor or other vibration device, e.g. a piezoelectric driver, may be used for this purpose. Preferably, the vibration speed, or frequency, is different than the speed, or frequency, of the first diffuser 50, 50'. The movement of the output fibre 34 has a diffusing effect on the light carried by the fibre 34. More importantly however the movement of the output fibre 34, being unsynchronised with the rotation of the diffuser 50, disrupts any periodic spatial pattern that may otherwise result from the periodic movement of the diffuser 50. Advantageously, the disruptive effect of vibrating the fibre 34 may be achieved without having to wrap the fibre 34 around the vibration device, for example it may be achieved by vibrating an end of the fibre 34 or an unwound length of fibre 34.

More generally, the first optical homogenizing means and second optical homogenizing means operate at different frequencies such that their movement is not synchronised. In particular, the first optical homogenizing means and second optical homogenizing means move in a periodic manner with a respective different frequency. In preferred embodiments, this is achieved by rotating the first and second diffusers 50, 50', 60, 60' at different speeds. The preferred arrangement is such that the first diffuser 50, 50' and second diffusing means do not move in a synchronised manner, or with a constant phase relationship. The non-synchronisation of movement prevents repeating patterns from occurring in the output beam 18, i.e. the radiation beam emerging from the egress end 36 of the output fibre 34, which can adversely affect the quality of the images produced by the microscope or other end system. In preferred embodiments, the respective periodic movement of the first and second optical homogenizing means is configured so that the cross-sectional spatial pattern (in particular its cross-sectional intensity pattern) of the radiation beam 18 output from fibre 34 after any one period of the faster, or higher frequency, one of the first and second homogenizing means is uncorrelated, or substantially uncorrelated, with the cross-sectional spatial pattern (in particular its cross-sectional intensity pattern) of the radiation beam 18 output from fibre 34 after the previous period of the faster, or higher frequency, one of the first and second homogenizing means. The respective patterns are uncorrelated, or substantially uncorrelated, in that the cross-sectional pattern, in particular the cross-sectional intensity pattern, does not repeat after each period of the higher frequency homogenizer.

In use of the preferred embodiment, light from the egress end 33 of the input fibre 30 is imaged, other otherwise directed, to the first diffuser 50 by the optical coupler 40 to produce a spot on the first diffuser 50, preferably a magnified spot. The beam 18 travels from the first diffuser 50 to the second diffuser 60, producing a corresponding spot on the second diffuser 60. Optionally, one or more relay lens is provided between the diffusers 50, 60 to relay the spot from the first diffuser to the second diffuser. The beam 18 is directed from the second diffuser 60 to the optical coupler 40 (e.g. as a result of alignment of the couplers 40, 44 (as illustrated) and/or by means of any other conventional beam guiding component(s)), whereupon the coupler 44 directs the beam 18 into the ingress end 35 of the output fibre 34. The coupler 44 may be configured to image or focus the spot on the second diffuser 60 to the fibre 34, preferably with de-magnification.

The diameter of the beam 18 and characteristics of the diffusers 50, 60 are advantageously designed to provide efficient coupling of the light into the output fibre 34, and provide sufficient uniformity out of the fibre 34. For example, for coupling light into the output fibre 34 from the diffusers 50, 60, the beam diameter (Dd) incident on the diffuser 50, the effective combined diffuser angle (half angle alpha) of the diffusers 50, 60, the core diameter (Df) of the fibre 34 and the Numerical Aperture (NA) of the fibre 34 may approximately satisfy the relationship:

$$Dd*\sin(alpha) < Df*NA \quad [1]$$

The larger the value Dd*alpha, the larger the loss, but also the more mode variation there is as the diffusers move, and so more image uniformity can be obtained. If the beam 18 incident on the diffuser 50 is not collimated, then it will have some spread in angles (half angle theta), so equation [1] may be replaced by:

$$Dd*\sin(alpha+theta) < Df*NA \quad [2]$$

The light entering the fibre 34 should have angles below the acceptance angle (NA) of the fibre 34 and a spatial extent less than the fibre diameter (DO. This may be achieved by imaging the spot on the second diffuser 60 to the fibre 34 through the optical coupler 44 with de-magnification M. Preferably, the de-magnification satisfies:

$$Dd/M < Df \quad [3]$$

to satisfy the size requirements; and satisfies:

$$M*\sin(alpha+theta) < NA \quad [4]$$

for the angular requirements (the angle theta may be omitted for a collimated input beam).

The invention is not limited to the embodiment(s) described herein but can be amended or modified without departing from the scope of the present invention.

What is claimed is:

1. A radiation delivery apparatus comprising:
   a radiation beam input;
   a radiation beam output; and
   beam delivery means configured to deliver a radiation beam from said radiation beam input to said radiation beam output along an optical path, wherein said beam delivery means comprises:
   first optical homogenizing means; and
   second optical homogenizing means, and wherein said first optical homogenizing means and said second optical homogenizing means are configured to move in a periodic manner with a respective different frequency,
   wherein said first optical homogenizing means comprises a first optical diffuser that intersects and is movable with respect to said optical path, and wherein said first optical diffuser may be optically transmissive or optically reflective.

2. The apparatus of claim 1, wherein said second optical homogenizing means comprises a second optical diffuser that intersects and is movable with respect to said optical path, and wherein said second optical diffuser may be optically transmissive or optically reflective.

3. The apparatus of claim 1, wherein at least one of the group consisting of said first optical homogenizing means and said second optical homogenizing means are rotatable with respect to the optical path, and wherein said first optical homogenizing means and said second optical homogenizing means are preferably rotatable at a respective different speed or frequency.

4. The apparatus of claim 1, wherein said second optical homogenizing means comprises a second optical diffuser, and wherein said first and second optical diffusers are rotatable, and are rotated in use at a respective different speed or frequency to each other.

5. The apparatus of claim 1, wherein said first optical homogenizing means comprises a first optical diffuser, said second optical homogenizing means comprises a second optical diffuser, and wherein said first and second optical diffusers are arranged in said optical path so that said radiation beam travels, in use, from said first optical diffuser to said second optical diffuser.

6. The apparatus of claim 1, wherein said radiation beam output comprises an output optical fibre, preferably a multimode optical fibre, and wherein said beam delivery means is configured to direct said radiation beam into an ingress end of said output optical fibre.

7. The apparatus of claim 1, wherein said radiation beam input comprises in input optical fibre, preferably a multimode optical fibre, and wherein said beam delivery means is configured to direct said radiation beam from an egress end of said input optical fibre to said first optical homogenizing means.

8. The apparatus of claim 1, wherein the respective periodic movement of the first and second optical homogenizing means is configured so that a cross-sectional spatial pattern of the radiation beam at said radiation beam output after any one period of the higher frequency one of the first and second homogenizing means is substantially uncorrelated with the cross-sectional spatial pattern of the radiation beam at said radiation beam output after the previous period of the higher frequency one of the first and second homogenizing means.

9. The apparatus of claim 1, wherein said first optical homogenizing means is movable to modify a cross-sectional spatial pattern of said radiation beam, and wherein said second optical homogenizing means is movable to further modify said cross-sectional spatial pattern of said radiation beam.

10. The radiation delivery apparatus as claimed in claim 1, incorporated into a microscope system comprising a radiation source module and a microscope module, said radiation delivery apparatus being configured to deliver the radiation beam from the radiation source module to the microscope module.

11. A method of homogenizing a radiation beam, the method comprising:
   directing said radiation beam to first optical homogenizing means comprising a first optical diffuser that may be optically transmissive or optically reflective;
   directing said radiation beam from said first optical homogenizing means to second optical homogenizing means; and
   moving said first optical homogenizing means and said second optical homogenizing means in a periodic manner with a respective different frequency.

12. The method of claim 11, including:
   modifying a cross-sectional spatial pattern of said radiation beam by moving said first optical homogenizing means; and
   further modifying said cross-sectional spatial pattern of said radiation beam by moving said second optical homogenizing means.

13. An apparatus for homogenizing a radiation beam, the apparatus comprising:
   means for directing said radiation beam to first optical homogenizing means;
   means for directing said radiation beam from said first optical homogenizing means to second optical homogenizing means;

means for moving said first optical homogenizing means in a periodic manner; and means for moving and said second optical homogenizing means in a periodic manner, wherein said moving means are configured to move said first optical homogenizing means and said second optical homogenizing means with a respective different frequency;

wherein said first optical homogenizing means comprises a first optical diffuser that may be optically transmissive or optically reflective.

14. A radiation delivery apparatus comprising:
a radiation beam input;
a radiation beam output; and
beam delivery means configured to deliver a radiation beam from said radiation beam input to said radiation beam output along an optical path, wherein said beam delivery means comprises:
first optical homogenizing means; and
second optical homogenizing means, and wherein said first optical homogenizing means and said second optical homogenizing means are configured to move in a periodic manner with a respective different frequency, and wherein said radiation beam output comprises an output optical fibre, preferably a multimode optical fibre, and wherein said beam delivery means is configured to direct said radiation beam into an ingress end of said output optical fibre.

15. The apparatus of claim 14, wherein said first optical homogenizing means comprises a first optical diffuser, said second optical homogenizing means comprises a second optical diffuser, and wherein said first and second optical diffusers are arranged in said optical path so that said radiation beam travels, in use, from said first optical diffuser to said second optical diffuser, and wherein said beam delivery means is configured to direct said radiation beam from said second optical diffuser to said output optical fibre, preferably through free space.

16. The apparatus of claim 15, wherein the output fibre has an optical coupler at an ingress end of the output fibre, the optical coupler preferably being configured to receive the radiation beam from free space and to direct the radiation beam into the ingress end of the output fibre, and wherein said optical coupler optionally comprises at least one optical element for de-magnifying the radiation beam, and wherein, said optical coupler optionally comprises at least one optical element for focusing the radiation beam into the ingress end of the output fibre.

17. The apparatus of claim 14, wherein said second optical homogenizing means comprises means for moving the output fibre in a periodic manner, preferably in a reciprocating manner.

18. A radiation delivery apparatus comprising:
a radiation beam input;
a radiation beam output; and
beam delivery means configured to deliver a radiation beam from said radiation beam input to said radiation beam output along an optical path, wherein said beam delivery means comprises:
first optical homogenizing means; and
second optical homogenizing means, and wherein said first optical homogenizing means and said second optical homogenizing means are configured to move in a periodic manner with a respective different frequency, and wherein said radiation beam input comprises in input optical fibre, preferably a multimode optical fibre, and wherein said beam delivery means is configured to direct said radiation beam from an egress end of said input optical fibre to said first optical homogenizing means.

19. The apparatus of claim 18, wherein said first optical homogenizing means comprises a first optical diffuser, said second optical homogenizing means comprises a second optical diffuser, and wherein said first and second optical diffusers are arranged in said optical path so that said radiation beam travels, in use, from said first optical diffuser to said second optical diffuser, and wherein said beam delivery means is configured to direct said radiation beam from said input optical fibre to said first optical diffuser, preferably through free space.

20. The apparatus of claim 18, wherein an optical coupler is provided at an egress end of the input fibre, the optical coupler preferably being configured to receive the radiation beam from the egress end of the input fibre and to emit the radiation beam into free space.

21. The apparatus of claim 20, wherein the optical coupler comprises at least one optical element for magnifying the radiation beam or at least one optical element for focusing or imaging the radiation beam onto the first optical homogenizing means.

* * * * *